(12) United States Patent
Taddey et al.

(10) Patent No.: US 6,994,738 B2
(45) Date of Patent: Feb. 7, 2006

(54) SNOW FILTER

(75) Inventors: Edmund P. Taddey, Chicopee, MA (US); John A. Schwemmer, Ellington, CT (US); Mark L. Harris, Vernon, CT (US); Robert A. Premont, East Longmeadow, MA (US)

(73) Assignee: Hamilton Sundstrand, Windsor Locks, CT (US)

( * ) Notice: Subject to any disclaimer, the term of this patent is extended or adjusted under 35 U.S.C. 154(b) by 39 days.

(21) Appl. No.: 10/446,748

(22) Filed: May 28, 2003

(65) Prior Publication Data

US 2004/0237481 A1 Dec. 2, 2004

(51) Int. Cl.
*B01D 35/02* (2006.01)
(52) U.S. Cl. .......................... 55/306; 55/336; 55/350.1; 55/463; 55/521; 60/39.092
(58) Field of Classification Search ................ 55/306, 55/336, 463, 521, 350.1, 488, 489; 60/39.092
See application file for complete search history.

(56) References Cited

U.S. PATENT DOCUMENTS

| 2,992,542 | A |   | 7/1961  | Arthur .......................... 62/156 |
| 3,339,349 | A |   | 9/1967  | Farnum ........................ 55/309 |
| 3,616,617 | A | * | 11/1971 | De Groote .................... 55/307 |
| 3,872,012 | A |   | 3/1975  | Endicott ...................... 210/297 |
| 3,884,655 | A | * | 5/1975  | Coop ........................... 96/380 |
| 4,157,902 | A | * | 6/1979  | Tokar .......................... 55/385.3 |
| H535      | H | * | 10/1988 | Sam et al. ..................... 55/296 |
| 4,882,055 | A | * | 11/1989 | Stamstad ..................... 210/483 |
| 4,904,384 | A | * | 2/1990  | Potz ............................ 210/309 |
| 5,484,575 | A | * | 1/1996  | Steenackers ................. 422/176 |
| 5,549,722 | A | * | 8/1996  | Zemaitis et al. .............. 55/463 |
| 5,549,724 | A | * | 8/1996  | Mochida ....................... 55/521 |
| 5,814,117 | A | * | 9/1998  | Mochida ..................... 55/385.3 |
| 5,902,365 | A | * | 5/1999  | Haggard ....................... 55/498 |
| 6,059,851 | A | * | 5/2000  | DePietro et al. ........... 55/385.3 |
| 6,270,558 | B1| * | 8/2001  | Theiler .......................... 96/61 |
| 6,319,298 | B1| * | 11/2001 | Ng-Gee-Quan .............. 55/331 |
| 6,375,854 | B2| * | 4/2002  | Beplate ....................... 210/767 |

FOREIGN PATENT DOCUMENTS

GB          760669        11/1956

OTHER PUBLICATIONS

International Search Report, Oct. 1, 2004.

* cited by examiner

*Primary Examiner*—Richard L. Chiesa
(74) *Attorney, Agent, or Firm*—Carlson, Gaskey & Olds

(57) ABSTRACT

A snow filter for an airplane cabin air supply system is provided with a coned inlet screen which allows some air to pass through and some snow to be retained. The coned configuration diverts much of the air and snow toward a downstream conical retaining and collecting screen positioned toward the outlet of the snow filter. Snow is retained and collected at this point while air is able to pass through the screen. Downstream of the coned inlet screen and upstream of the conical retaining and collecting screen is an open air flow mid-portion that enables tortuous flow of air as the snow is directed toward the conical retaining and collecting screen in an annular collection volume. The outlet of the snow filter is provided with a contact sleeve that allows the snow filter to be fittingly received by a surrounding corresponding air duct. Thus a snow filter is provided that effectively separates snow from a flow of air while maintaining a clog-free path.

16 Claims, 2 Drawing Sheets

SNOW FILTER

BACKGROUND OF THE INVENTION

The present invention relates to a unique snow filter for use in an air supply system for the cabin of an airplane.

In an airplane, an air supply system serves to provide conditioned air flow into the cabin by way of an arrangement of air ducts. The conditioned air has been prepared into a desirable and comfortable state from an undesirable state. Before the air reaches the cabin, it is subject to conditions, such as low temperatures, that cause ice particles to form. These particles are known as "snow" in the art. As the air, mixed with snow, flows through the air ducts toward the cabin, it becomes necessary to filter out the snow from the passing air.

Prior art snow filters serve to filter snow from air along a single path and tend to result in a snow filter that clogs easily, thus rendering the snow filter ineffective. It would be desirable to provide the air ducts of the air supply system for the cabin of an airplane with a snow filter of a type that will not clog as it effectively filters snow from the passing flow of air.

The unique snow filter of the present invention is effective in filtering snow from the passing flow of air while remaining free of clogs.

SUMMARY OF THE INVENTION

In the disclosed embodiment of this invention, the air ducts in an air supply system for the cabin of an airplane are equipped with a snow filter configured such that a tortuous path for the flow of air is provided. Thus, when air and snow pass through the path, the snow is filtered and collected without clogging the filter. Generally, only air is allowed to pass on toward the cabin of the airplane.

The inventive snow filter fits within an air duct and operates by providing a tortuous path for air to pass through by way of a combination of screened or filtrous and non-screened path segments as well as a combination of coned, conical and non-conical surface configurations. Together, these features serve to collect and retain the snow while allowing air to continue to flow down through the air duct.

The snow filter is provided with a coned inlet screen that allows some air to pass through with the snow retained. The coned configuration also diverts much of the air and snow toward a conical retaining and collecting screen positioned toward the outlet of the snow filter. Snow is retained and collected at this point while air is able to pass through the screen. Downstream of the coned inlet screen and upstream of the conical retaining and collecting screen is a non-conical open air flow path segment that enables the tortuous flow of air toward the outlet of the filter. The snow is, at this point, generally directed toward the conical retaining and collecting screen, which creates an annular collection volume. The outlet of the snow filter is provided with a contact sleeve that allows the snow filter to be fittingly received within a surrounding corresponding air duct. Thus a snow filter is provided that effectively separates snow from a flow of air still while maintaining a clog-free path.

These and other features of the present invention can be best understood from the following specification and drawings, the following of which is a brief description.

DETAILED DESCRIPTION OF THE DRAWINGS

Figure 1:
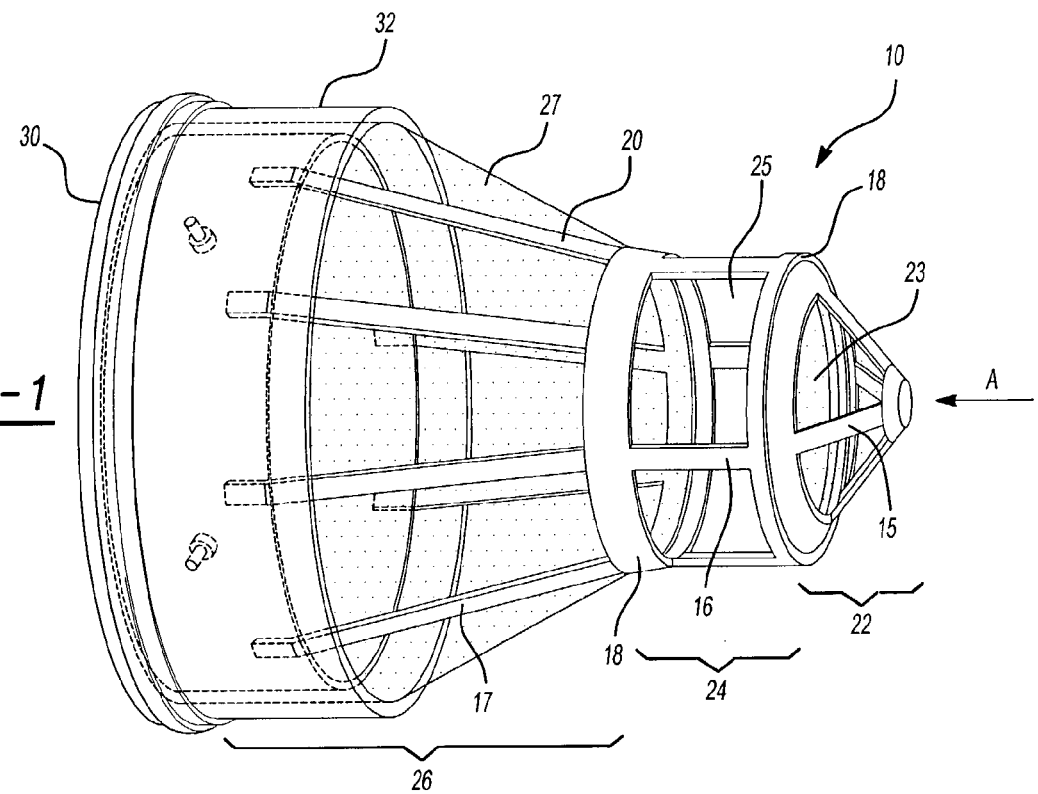
FIG. 1 is a perspective view of the snow filter of the present invention.

As shown in the perspective view in FIG. 1, the snow filter is generally shown at 10. The direction of air flow through the snow filter 10 is shown at arrow A. Snow filter 10 is generally comprised of a frame 20, including a coned inlet portion 22, a non-conical open air flow mid-portion 24, and a conical retaining portion 26. Snow filter 10 further comprises outlet 30, provided with air duct contact sleeve 32 which allows snow filter 10 to be fittingly received by a corresponding surrounding air duct as will be described below and as shown in FIG. 2.

With continued reference to FIG. 1, coned inlet portion 22 of frame 20 is provided with openings containing filter inlet screens 23. Non-conical open air flow mid-portion 24 of frame 20 is provided with openings 25 that do not contain any screen material, thus providing a non-filtered portion. Conical retaining portion 26 of frame 20 is provided with openings containing filter retaining screens 27. As can be seen, the frame 20 has circumferentially extending portions 18 and axially extending legs 15, 16, 17 respectively in portions 22, 24 and 26. It will be shown that the combination of filter and non-filter portions as well as coned, conical and non-conical portions provides the previously described non-clogging feature of the inventive snow filter.

Figure 2:
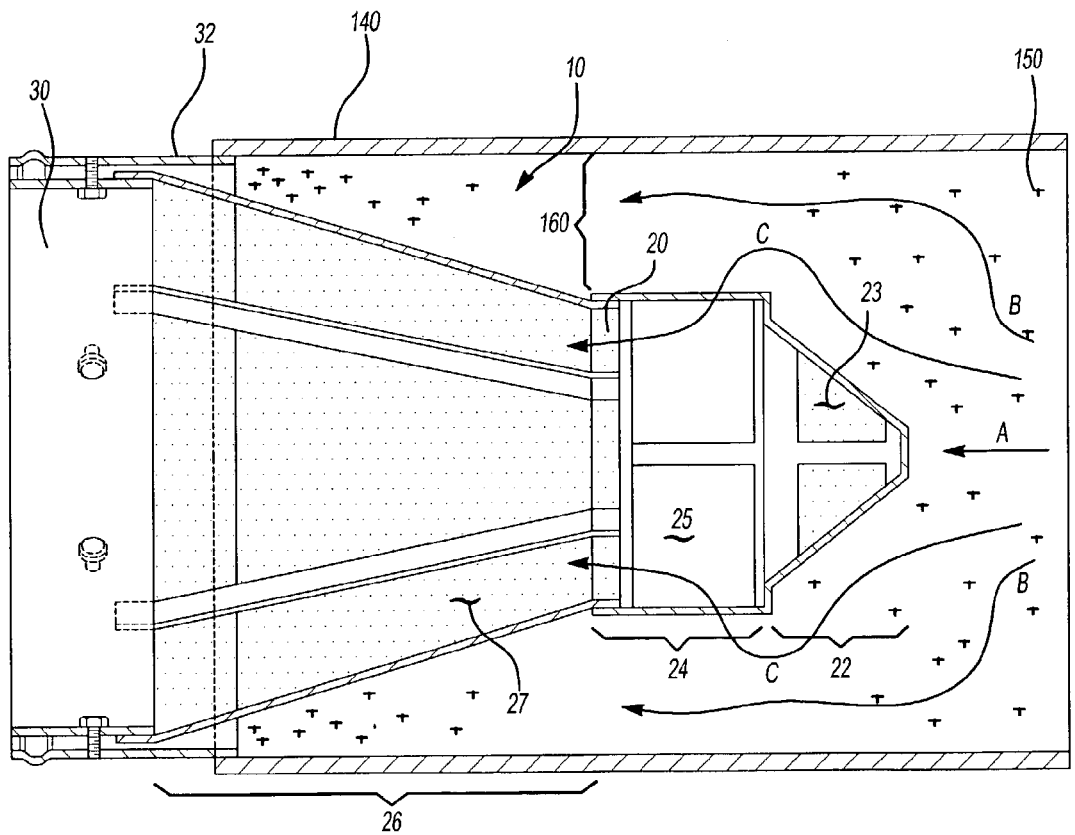
FIG. 2 is a schematic cross sectional view of the inventive snow filter as it fits within a portion of an air duct.

Referring now to the schematic cross sectional view in FIG. 2, the inventive snow filter is shown generally at 10 and the surrounding air duct is shown at 140. Air and snow flow through duct 140 in the direction indicated by arrow A. Again, frame 20 includes coned inlet portion 22 provided with openings containing filter inlet screens 23. Frame 20 also includes non-conical open air flow mid-portion 24 which is provided with openings 25 that do not contain any screened material, thus providing a non-filtered portion. Frame 20 further includes conical retaining portion 26 provided with openings containing filter screens 27. Snow filter 10 also has outlet 30 provided with air duct contact sleeve 32 which enables snow filter 10 to be fittingly received by surrounding air duct 140.

The operation of snow filter 10 is as follows: Air and snow 150 flow toward air filter 10 in the direction of arrow A. As air and snow 150 come into contact with coned inlet portion 22, inlet screens 23 allow some air to pass through while retaining some snow 150. The coned configuration of coned inlet portion 22 diverts much of the incoming air and snow 150 in the direction of flow denoted by arrows B. Snow 150 and air flow towards conical retaining portion 26 where snow is retained on retaining screens 27, while air may pass through. During the course of flow of air and snow at a point downstream of the coned inlet portion 22 and upstream of the conical retaining portion 26, a tortuous path for the flow of air is provided by way of the non-conical open air flow mid-portion 24 having openings 25. This tortuous air flow path is denoted by arrows C. Filtered air then exits from snow filter outlet 30 as the snow 150 is generally collected in an annular collection volume 160. Annular collection volume 160 is formed in the space between air duct 140 and retaining screens 27. Thus, the provision of a non-filtered, non-conical portion of the snow filter enables filtered air to flow through by providing a tortuous flow path for air, while snow is directed towards and collected by an annular collection volume without clogging the flow of air.

Generally, the prior art had a single flow path wherein the air and snow all passed through a screen. That screen could quickly become clogged. The present invention, by utilizing a combination of paths, reduces the likelihood of clogging. The non-filtered portion of the flow path will certainly not clog. On the other hand, the provision of the tortuous path to the non-filtered portion greatly eliminates the likelihood of significant snow flowing with the air into this non-filtered portion. Of course, some limited amount of snow could flow with the air through the non-filtered portion, however, the total amount is likely to be negligible.

Figure 3:
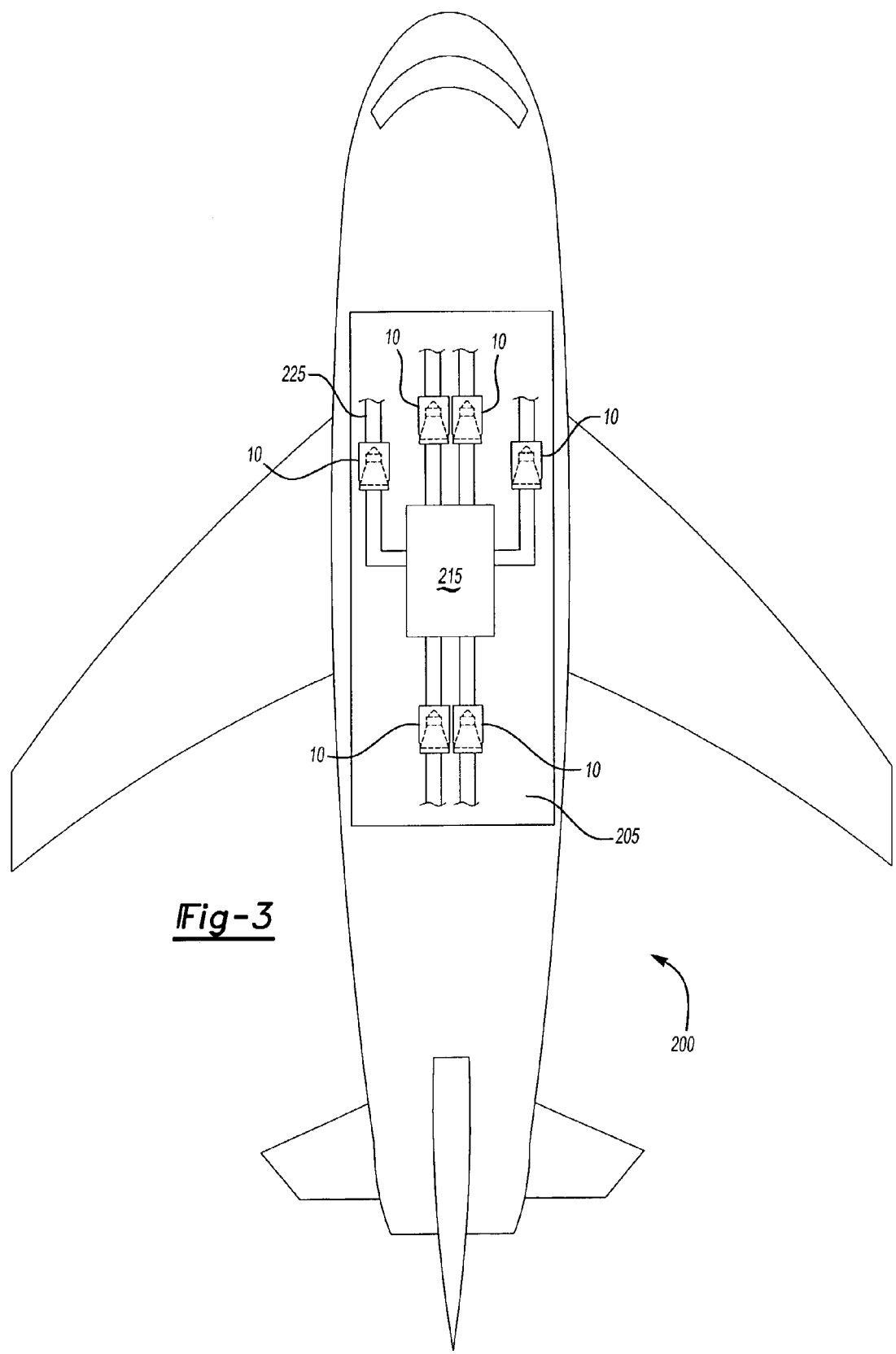
FIG. 3 is a schematic view of an air supply system for the cabin of an airplane that utilizes the inventive snow filter.

FIG. 3 schematically depicts a view of an air supply system in the cabin of an airplane utilizing the inventive snow filter. The airplane is denoted generally at 200 and the airplane cabin is denoted generally at 205. Cabin 205 includes air supply system 215, and is provided with a plurality of air ducts 225. Each air duct fittingly receives the snow filter 10 of the present invention so that suitably conditioned air may flow into the airplane cabin 205.

A preferred embodiment of this invention has been disclosed, however, a worker in this art would recognize that certain modifications would come within the scope of this invention. For that reason, the following claims should be studied to determine the true scope and content of this invention.

What is claimed is:

1. A snow filter for separating snow from passing air within an air duct of an air supply system comprising:
   a body defining at least two path segments, with a first path segment containing a filter, and a second path segment containing no filter, with a portion of air flowing through each of said first and second path segments, each of said first and second path segments beginning radially outwardly relative to a central axis of the snow filter, and said first path extending radially inwardly through said filter, and said second path segment extending radially inwardly through said area of no filter.

2. A snow filter as recited in claim 1, wherein said second flow path is a tortuous path.

3. A snow filter as recited in claim 2, wherein said snow filter has an inlet end provided with a forward coned screen area, and a downstream end also provided with a screen, said second path segment being intermediate said forward coned screen area and said downstream end.

4. A snow filter as recited in claim 3, wherein said outlet of said snow filter is provided with a contact sleeve that allows said snow filter to be fittingly received into an air duct.

5. A snow filter as recited in claim 3, wherein said snow filter is provided with a relatively rigid frame structure having circumferentially extending portions, and interconnecting circumferentially spaced legs.

6. A snow filter as recited in claim 3, wherein said downstream end is provided by a conically expanding portion.

7. A snow filter as recited in claim 6, wherein said forward coned screen area tending to divert air and snow radially outwardly and toward said downstream end, with said second path generally only receiving air flow, with the snow passing towards said downstream end.

8. A snow filter as recited in claim 1, wherein said first path extends through a portion of the filter, then expands conically outwardly from a central axis, and said second path being through a portion of the filter that is formed generally cylindrical relative to said central axis, such that said second path with no filter receives little or no snow, and generally only air flow.

9. An air supply system for an airplane cabin comprising:
   an air conditioning system for providing conditioned air to be delivered to an airplane cabin;
   a plurality of ducts receiving air from said air conditioning system and communicating with the airplane cabin;
   said ducts including a snow filter for separating snow from said conditioned air; said snow filter including a body defining at least two path segments, with a first path segment containing a filter and a second path segment containing no filter, with a portion of said air flowing within each of said first and second paths; and
   said first path extends through a portion of the filter, then expands conically outwardly from a central axis, and said second path being through a portion of the filter that is formed generally cylindrical relative to said central axis, such that said second path with no filter receives little or no snow, and generally only air flow.

10. An air supply system as recited in claim 9, wherein said second flow path is a tortuous path.

11. An air supply system as recited in claim 10, wherein said snow filter has an inlet end provided with a forward coned screen area, and a downstream end also provided with a screen, said second path segment being intermediate said forward screen area and said downstream end.

12. An air supply system as recited in claim 11, wherein said outlet of said snow filter is provided with a contact sleeve that allows said snow filter to be fittingly received into an air duct.

13. An air supply system as recited in claim 11, wherein said snow filter is provided with a relatively rigid frame structure having circumferentially extending portions, and interconnecting circumferentially spaced legs.

14. An air supply system as recited in claim 11, wherein said downstream end is provided by a conically expanding portion.

15. An air supply system as recited in claim 14, wherein said forward coned screen area tending to divert air and snow radially outwardly and toward said downstream end, with said second path generally only receiving air flow, with the snow passing towards said downstream end.

16. An air supply system for an airplane cabin comprising:
   an air conditioning system for providing conditioned air to be delivered to an airplane cabin;
   a plurality of ducts receiving air from said air conditioning system and communicating with the airplane cabin;
   said ducts including a snow filter for separating snow from said conditioned air; said snow filter including a body defining at least two path segments, with a first path segment containing a filter and a second path segment containing no filter, with a portion of said air flowing within each of said first and second paths; and
   each of said first and second path segments beginning radially outwardly relative to a central axis of the snow filter, and said first path extending radially inwardly through said filter, and said second path segment extending radially inwardly through said area of no filter.

* * * * *